G. YULE & W. W. STONE.
Hat-Stiffening Machine.
No. 213,727. Patented Mar. 25, 1879.
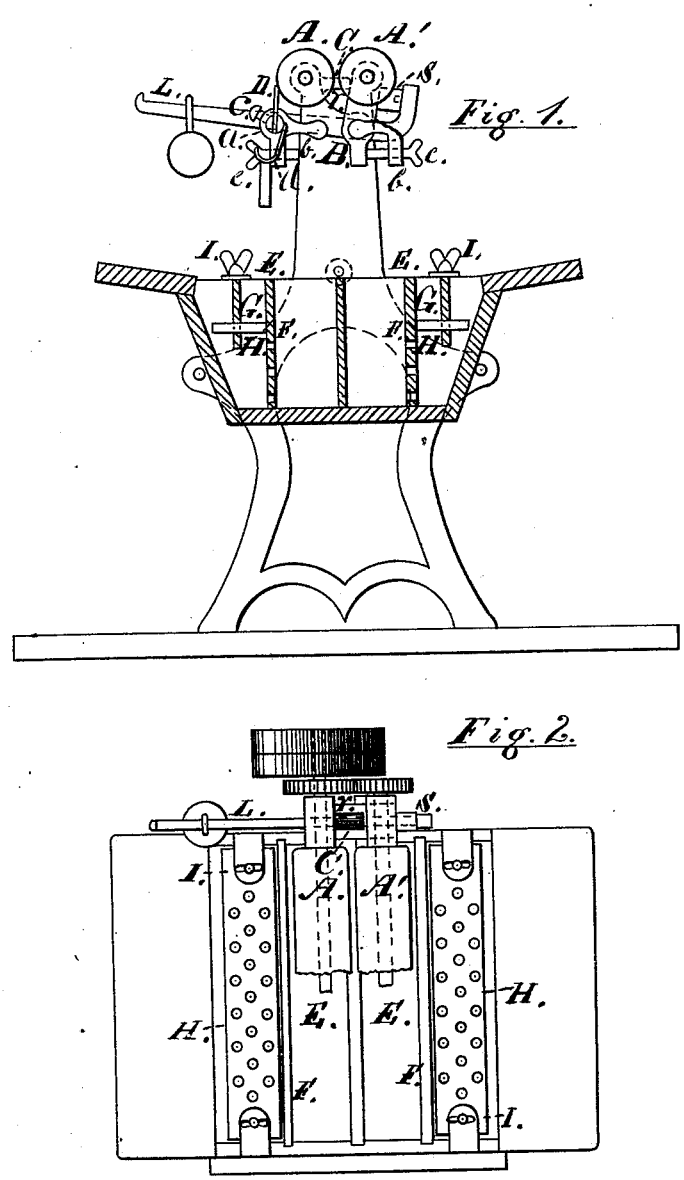
Attest:
Joseph A. Eno
John H. Ross
Inventor.
George Yule
William W. Stone
By Horace Harris
Atty

UNITED STATES PATENT OFFICE.

GEORGE YULE, OF NEWARK, NEW JERSEY, AND WILLIAM W. STONE, OF BETHEL, CONNECTICUT; SAID STONE ASSIGNOR TO SAID YULE.

IMPROVEMENT IN HAT-STIFFENING MACHINES.

Specification forming part of Letters Patent No. 213,727, dated March 25, 1879; application filed December 20, 1878.

*To all whom it may concern:*

Be it known that we, GEORGE YULE, of Newark, in the county of Essex and State of New Jersey, and WILLIAM W. STONE, of Bethel, in the county of Fairfield and State of Connecticut, have invented a new and useful Improvement in Machines for Stiffening Full Stiffs, Semi-Stiffs, and Stiff-Brim Hats, which improvement is fully set forth in the following specification and accompanying drawings, in which—

Figure 1 is a sectional elevation. Fig. 2 is a plan view.

The object of our invention is to stiffen hats of the above description by means of adjustable mechanism, whereby the work may be more perfectly and rapidly performed, and thereby the expense be greatly reduced.

For this purpose we use rollers A and A', between which the hats are put. In these rollers one is made adjustable, providing for different thicknesses of hats to go between them, having the roller A' hung to a swing-bracket, B, at each end, which allows it to swing off, and between the rollers is a stop, r, to prevent the banging together of the rolls after the hat has been passed through between them. C is a regulating-screw, or any other device, at each end, to gage the distance desirable to have the rollers apart.

The weighted lever L, used to press the rollers together, has on the inner end a rubber, S, or other spring, to adjust the rollers to unequal thicknesses of hats, and prevent the nipping or creasing of the hat as it passes through the rollers. Connected with these rollers are adjustable scrapers D, to scrape or wipe off from the rollers any of the shellac or other stiffening material that may have stuck to them from contact with the hats.

The scrapers are usually made of rubber, but may be of some other material, and are attached to rollers $a$, hung to the brackets $b$, which are held in position by set-screws $c$ after once properly adjusted. They may be further adjusted for light or hard pressure by the screws $e$.

Under the wiper is a gutter, $d$, to catch the liquid that is scraped off, and carry it back into the vat E, so that it will not run back on the hat while being dipped.

Below the rollers and scrapers is a vat, E, into which the liquid for stiffening is deposited. In this vat is a longitudinal perforated partition, F, to allow the liquid to pass, but to keep back the froth from the part of the vat G. In this vat G is an adjustable false bottom, H, perforated to allow the liquid to rise above it. This is made adjustable vertically by the screws I, to regulate the depth for dipping the hats. The hats are dipped in this vat above the false bottom, and are then put through the machine, as above specified.

It is not claimed to be new to dip hats in a stiffening preparation and then put them through between rollers above the vats containing the liquid for stiffening; but there are elements set forth in the following claims which are believed to be novel.

I claim—

1. The rollers A and A', having the roller A' hung to the swing-brackets B, and having between them the stops $r$, substantially as set forth.

2. The combination of the adjustable rollers A and A' and the weighted levers L, having the spring $s$, substantially as set forth.

3. The adjustable scraper D, fixed in the rollers $a$, held by the set-screw $c$, and hung in the swinging brackets $b$, and adjusted by the screws $e$, substantially as set forth.

4. The gutter $d$ under the scraper D, to catch the drippings from the scraper and carry it into the vat E, substantially as set forth.

5. The vat E G, divided by the perforated partition F, for the purpose specified.

6. In combination with the vat E G, having the perforated partition F, the adjustable bottom H, as set forth.

GEORGE YULE.
WILLIAM W. STONE.

Witnesses:
HORACE HARRIS,
JOHN H. ROSS.